United States Patent [19]

Casey et al.

[11] 3,994,802

[45] Nov. 30, 1976

[54] REMOVAL OF BOD AND NITROGENOUS POLLUTANTS FROM WASTEWATERS

[75] Inventors: Jeremiah P. Casey, Macungie; Marshall L. Spector, Allentown, both of Pa.

[73] Assignee: Air Products and Chemicals, Inc., Allentown, Pa.

[22] Filed: Apr. 16, 1975

[21] Appl. No.: 568,712

[52] U.S. Cl. .................................. 210/5; 210/7; 210/11; 210/16
[51] Int. Cl.² ............................................ C02C 1/06
[58] Field of Search .................................. 210/3–8, 210/11, 14–17

[56] References Cited
UNITED STATES PATENTS

| | | | |
|---|---|---|---|
| 2,419,492 | 4/1947 | Green | 210/5 |
| 3,607,736 | 9/1971 | Miyaji | 210/11 |
| 3,654,147 | 4/1972 | Levin et al. | 210/16 |
| 3,764,523 | 10/1973 | Stankewich | 210/15 |
| 3,846,289 | 11/1974 | Jeris et al. | 210/8 |
| 3,849,303 | 11/1974 | Torpey | 210/16 |
| 3,864,246 | 2/1975 | Casey et al. | 210/15 |

Primary Examiner—Thomas G. Wyse
Attorney, Agent, or Firm—Bernard M. Weiss; Barry Moyerman

[57] ABSTRACT

A multistage treatment is disclosed for the removal of carbonaceous BOD and nitrogenous pollutants from wastewaters, wherein the influent wastewater undergoes successive nitrification-denitrification in the presence of recycled activated sludge containing a mixed culture biomass comprising heterotrophic and autotrophic organisms. The initial mixing of the wastewater with recycled sludge is effected in the presence of sufficient oxygen to maintain oxic conditions. The mixed liquor from the initial oxic treatment, without intermediate separation of solids, is passed to an anoxic stage wherein nitrites and nitrates ($NO_x^-$, $x = 2,3$) formed by oxidation of ammonium compounds are reduced to nitrogen gas. Any number of oxic treating stages each followed by an anoxic stage may be employed. The final treating stage prior to solids separation from the mixed liquor may be either oxic or anoxic. The separated solids constitute the activated sludge recycled to at least the initial mixing stage. A short residence time, resulting in a high food to biomass ratio, is maintained in the initial oxic stage or the first subsection thereof, in order to avoid sludge bulking and to promote an active dense biomass.

29 Claims, 7 Drawing Figures

REMOVAL OF BOD AND NITROGENOUS POLLUTANTS FROM WASTEWATERS

BACKGROUND OF THE INVENTION

1. Field of the Invention

The present invention relates to an activated sludge sewage treatment process and is particularly concerned with the removal from domestic and industrial wastewaters of nitrogenous pollutants as well as carbonaceous BOD.

2. Description of the Prior Art

In the well-known activated sludge system, domestic sewage, wastewater from industrial plants, or a combination of the two, is treated with air or other oxygen-containing gas in the presence of the micro-organisms furnished by the recycled activated sludge, to effect degradation of organic biologically degradable material, designated BOD. Following such oxidative treatment in one or more stages, the mixed liquor is introduced into a settler or clarifier, from which a portion of the settled solids are recycled to provide the activated sludge containing the microorganisms effective in consuming and digesting the organic matter (BOD) in the waste. The supernatant liquor from the settler or clarifier is returned to receiving waters generally after some further purification or disinfection treatment. While earlier commercial activated sludge plants employ air to furnish the oxygen needed to sustain the metabolic function of the microorganisms, more recent commercial installations employ, in one or more of the oxidation stages, aeration gas having a higher oxygen content than the 21% contained in atmospheric air.

A problem that has become more troublesome in recent years is that of eutrophication of streams, lakes and reservoirs receiving "purified" wastewaters which retain high nutrient content, chiefly such bio-stimulants as nitrogen and phosphorus. Effective means have been devised for removal of phosphorus compounds by chemical precipitation, carried out prior to, subsequent to, or during treatment to remove organic carbonaceous materials (BOD). Chemical usage required for effective precipitation is, however, substantial and costly. Removal of nitrogenous nutrients from wastewater has been the subject of extensive research in the past several years and a number of different methods have been suggested to achieve this result. Means of blowing ammonia out of alkalized wastewater has been found to be impractical in that the ammonia so removed is often recycled through the atmosphere to ground waters, hence ultimately to receiving waters. None of these or other suggested methods meet all of the desired goals from the standpoint of costs of installation and operation, facility and reliability of operation, and flexibility to meet variations in composition and quantity of influent waste.

Among the more promising methods for nitrogen removal from wastewater is that involving the so-called nitrificationdenitrification technique. Nitrification involves oxidation of ammonia values in the waste to nitrites and/or nitrates (referred to as $NO_x-$) by suitable microorganisms. As expressed in the article (inter alia), "Nitrification in the Activated-Sludge Process" by A. L. Downing, H. A. Painter and G. Knowles in the 1964 Journal of the Institute of Sewage Purification, pp. 130–158, Nitrosomonas bacteria are effective in converting ammonia to nitrate and the nitrite is further oxidized to nitrate by Nitrobacter. These autotrophic nitrifiers utilize inorganic carbon for cell synthesis and obtain their energy from the oxidation of inorganic nitrogenous substrate. Since these nitrifiers grow at a slower rate than the heterotrophic bacteria responsible for the oxidation of the carbonaceous material in a biological waste treatment system, such as in an activated sludge process, it has heretofore been proposed to carry out the BOD removal from wastewater and the nitrification of ammonia values in separate treating stages, wherein the mixed liquor from the BOD removal stage is subjected to settlement and the sludge from such settlement reputed to be rich in bacteria effective in consuming organic carbonaceous material, is returned to the BOD removal first stage. The supernatant effluent from the solids settlement passes on to a second stage of aeration with oxygencontaining gas and the treated mixed liquor therefrom subjected to settlement of sludge solids which are returned to such second stage treatment, said settled sludge containing nitrifying microorganisms.

Exemplifying the two stage biological process once proposed as required for guaranteed complete nitrification, is the work described by H. E. Wild, C. N. Sawyer and T. C. McMahon at the October 1970 Water Pollution Control Federation Conference and published as "Factors Affecting Nitrification Kinetics", Journal WPCF 43, No. 9, 1971, pp. 1845–1854.

Once oxidation of influent ammonia values is accomplished the product $NO_x^-$ may still be harmful to receiving waters. Nitrate is a preferred substrate for algae growth. Furthermore, $NO_x^-$ has been indicted as a causative precursor of methemoglobinemia (blue babies) as recently reviewed by H. I. Shuval and N. Gruener in the article "Epidemiological and Toxicological Aspects of Nitrates and Nitrates in the Environment", Am. Journal of Public Health 62 No. 8 (1972) pp. 1045–1052.

In the absence of dissolved gaseous oxygen, numerous organisms such as Pseudomonas denitrificans will seek the nitrate oxygen as an oxidizing agent, i.e. a formal electron acceptor.

Facultative heterotrophs abound in activated sludge, and processes have been devised, and praised (*Water Wasteland*, by D. Zwick and M. Benstock of Ralph Nader's Study Group on Water Pollution, Chapter 19, page 374, Bantam Book, 1972), in which sludge is contacted with nitrate-reducing organisms to reduce nitrate to innocuous nitrogen gas.

Stoichiometric equivalents of oxygen required for nitrification and the oxygen demands necessary for denitrification may be simply summarized as:

$$\text{Nitrosomonas} \quad NH_3 + 3[O] \rightarrow H_2O + HNO_2 \quad \text{(Eq.1)}$$

$$\text{Nitrobacter} \quad HNO_2 + [O] \rightarrow HNO_3 \quad \text{(Eq.2)}$$

and overall, $$NH_3 + 2O_2 \rightarrow HNO_3 + H_2O \quad \text{(Eq.3)}$$

wherein the stoichiometric ratio of O/N is 4.57 g/g. Denitrifying bacteria exhibit the following stoichiometry:

$$2HNO_3 \rightarrow N_2 + H_2O + 5[O] \quad \text{(Eq.4)}$$

wherein the ration of O/N is 2.86 g/g.

Due to the valence stage change in N only 62.5% of the oxygen donated to ammoniacal N may be considered as an electron acceptor in denitrification. The oxygen demanding substances biologically oxidized utilizing nitrate oxygen may be represented by the generic term biochemical oxygen demand (BOD) determined in accordance with procedures outlined in "Standard Methods for the Examination of Water and Wastewater", 13th Edition, A.P.H.A., A.W.W.A. and W.P.C.F. Publishers, 1971, for following initial cell utilization of dissolved gaseous oxygen or nitrate oxygen there appear to be similar metabolic pathways for oxygen utilization.

Exemplifying a sequential combination of techniques described above is the so-called "Three Sludge System" which employs separate stages of carbonaceous BOD removal, nitrification and denitrification, each stage having a subsequent settling step with independent recycle of sludge solids to its associated treating stage. The "Three Sludge System" is described by Mulbarger, M. C., in *Journal WPCF*, 43, No. 10, pp. 2059 et seq. (Oct. 1971).

In these described nitrification-denitrification procedures for removal of nitrogenous nutrients from wastewater the nitrification zone or stage is operated under aerobic conditions while the denitrification, effecting conversion of the previously formed nitrates and nitrites to free nitrogen, is carried out under anaerobic conditions. During nitrification, some part of the organic nitrogen substances may be converted into ammonia nitrogen and thus become available for conversion to nitrite or nitrate. For effective microbiological reduction of nitrates and nitrites by anaerobic denitrifying bacteria, sufficient organic sources of assimilable carbon, i.e. BOD, must be available to provide for their energy and growth.

Since, in a typical activated sludge plant most of the available BOD will have been oxidized prior to the denitrification operation, it has generally been found necessary to add an external assimilable carbon source, such as methanol or the like. Specifics of methanol utilization may be found described in the EPA Clean Water Water Pollution Control Research Series 17010DHT09/70 entitled "Methanol Requirement and Temperature Effects in Wastewater Denitrification".

Among problems encountered in the operation of certain activated sludge plants is that resulting from bulking sludge. Air activated plants often operate under such conditions of poor sludge characteristics. Oxygen activated sludge plants removing BOD, or nitrifying in addition to removing BOD, are not immune to the problem, as reviewed by R. C. Brenner in the article "EPA Experiences in Oxygen Activated Sludge", prepared in October 1973 for the EPA Technology Transfer Design Seminar Program. Furthermore, activated sludge plants designed to remove BOD, nitrify, and denitrify, such as the EPA operated Blue Plains facility (D. F. Bishop et al, "Single Stage Nitrification-Denitrification", October 9, 1974, seventh Annual WPCF Conference, Denver, Colo.) have suffered bulking sludge. Because of the poor settling characteristics of this kind of sludge, not only may an extreme reduction in the biomass concentration of the recycled sludge needed for effective operation of the activated sludge process result, but also a significant amount of the activated sludge may be lost over the weir of the settling tank. The bulking of sludge has been attributed by various investigators to different factors, and different techniques have accordingly been suggested for counteracting or preventing this bulking tendency. One of the important factors recognized as effecting or contributing to sludge bulking is the presence of filamentous microorganisms in the sludge. A solution to the problem of selective proliferation of filamentous bacteria in an activated sludge wastewater treating system is offered in U.S. Pat. No. 3,864,246. As described in this patent, the characteristics of the sludge are controlled by operating the initial contact zone for mixing influent waste with oxidizing gas and recycled sludge under conditions favoring selective propagation of active, rapidly settling, non-filamentous biomass thereby inhibiting the development of the undesired filamentous microorganisms. These favorable conditions for producing non-bulking sludge entail the provision of an adequately high food to biomass ratio in the initial mixing stage and the presence of sufficient dissolved oxygen in that stage.

SUMMARY OF THE INVENTION

An improved method has now been devised for efficient and economic treatment of municipal and other wastewaters by a single activated sludge system, whereby BOD removal, nitrification and denitrification can be achieved essentially by biological treatment in successive alternating oxic and anoxic treating zones without intermediate solids separation. By the arrangement, according to the invention, nitrites and/or nitrates formed by oxidation of ammonium substances in a preceding oxic zone are biologically converted in a subsequent anoxic zone to dischargeable nitrogen gas. A sufficient degree of oxygenation is provided during oxic stages to yield an active mixed biomass effective in both degradation of the BOD content of the waste to desired low limits and oxidation of ammoniacal substances in the wastewater (nitrification). Moreover, the arrangement according to the invention is such that the organic carbonaceous substances essential as a source of energy and cell metabolism during denitrification may be wholly or essentially supplied by non-iodized unconsumed BOD present during that stage, while the nitrates and nitrites formed during nitrification contribute to furnishing the oxygen requirements for oxidation of BOD by facultative heterotrophic microorganisms and are thereby reduced to elemental nitrogen (denitrification) and, furthermore, lower the total oxygen otherwise supplied to the system.

It is essential in the practice of the invention that the initial treating stage in which the influent waste is mixed with recycled sludge be operated under oxic conditions and in the presence of an adequate supply of dissolved oxygen. During this initial contact it is important also that conditions be maintained to assure a high growth rate for the selective production of those types of microorganisms leading to production of high density sludge having good settling properties. The second stage of treatment must be anoxic in order to promote denitrification.

In the simplest embodiment of the invention only three treating stages or zones need be employed, an initial oxic zone followed by an intermediate anoxic zone and a final oxic zone. These may vary in capacity, as will hereinafter be explained, and any one or more of these may be sub-divided into compartments or sub-zones. In the preferred practice of the invention, however, no less than four successive treating zones would be employed, in alternating sequence of an oxic followed by an anoxic stage. A fifth successive zone which is aerobic may be employed in order to provide a high level of dissolved oxygen to the treated mixed liquor entering the clarifier, and thereby providing dissolved oxygen to the effluent.

By the present invention, a high degree of nitrification is achieved, yet, as will be more fully explained below, a sufficiently high food/biomass ratio is maintained in the initial oxic zone of contact of activated sludge with the wastewater charge or in an equivalent hydraulic sub-zone thereof (see Levenspiel, "Chemical Reaction Engineering", John Wiley & Sons, N. Y. 1962, pp. 242–308), to assure selective propagation of highly active, non-filamentous biomass and ultimate yield of a dense, readily settling sludge. By maintaining a relatively short influent detention time in the initial oxic treating zone, as is advocated in accordance with one of the alternative embodiments of the invention, complete oxidation of BOD is avoided so that the mixed liquor leaving that zone has a relatively high specific oxygen uptake rate.

The process of the invention may be practiced in a single treating basin partitioned into alternating oxic and anoxic zones, the odd numbered treating zones being oxic and the even numbered zones being anoxic. From the final treating zone the mixed liquor flows into a settler or clarifier, from which at least a portion of the settled sludge is recycled to the initial oxygenation zone. Microorganisms with associated $NO_x^-$ required for the biologic denitrification may be obtained by recycling a part of the mixed liquor from at least one downstream oxic treating zone, to at least the initial anoxic treating zone and, if desired, to other anoxic treating zones of the sequence. Alternatively, both the requisite BOD and microorganisms for denitrification may be supplemented by splitting out a portion of the sludge being recycled from the clarifier, to at least one ($NO_x^-$)-containing anoxic zone in the sequence. In a further modification, both internal recycle of mixed liquor from one or more oxic zones to an anoxic zone or zones is employed in addition to split recycle of settled sludge from the clarifier, with a portion going to the initial oxic zone and a portion going to one or more of the anoxic zones, thus enhancing contact of )$NO_x^-$) and denitrifying microorganisms in the presence of BOD.

In describing the invention herein, reference is made to oxic and anoxic zones or stages rather than to the more common expressions found in the literature, aerobic and anaerobic respectively. The terms oxic and anoxic are believed to be more definitive as applied to a stage of operation or zone in terms of its dissolved free oxygen content, whether such free oxygen is based on the presence of atmospheric air or other gas having an oxygen content of greater than 21%. Thus, the term "anoxic", as herein employed, refers to a condition of low oxygen tension, usually < 0.3 mg/l D.O. and under which nitrates and nitrites are reduced to nitrogen gas by facultative anaerobes. Documentation of this upper D.O. limit, found in the article "Factors Affecting Biological Denitrification of Wastewater" by R. N. Dawson and K. L. Murphy, presented at the Sixth International Water Pollution Research Conference, Session 15, Paper No. 31 and thereafter published by Pergamon Press, has been confirmed in the present work. Correspondingly, the term "oxic" refers to conditions of sufficiently high oxygen tension, usually > 1 mg/l D.O., whereby nitrifying bacteria present in activated sludge will convert nitrogenous compounds into nitrites and/or nitrates. No nitrification rate limitations have been noted above 1 mg/l D.O. and operations are usually designed to maintain a D.O. of at least 2 mg/l D.O. following prior art as described by Downing, Painter and Knowles and Wild, Sawyer and McMahon cited above.

The operation of the invention and the various modes in which it may be put into practice will be understood, and further advantages thereof will be appreciated from the detailed description which follows read in connection with the accompanying drawings illustrating the same.

In the drawings conventional accessories and equipment such as valves, pumps, stirrers, spargers, aerators, etc. have been largely omitted, since these in their various forms and embodiments are well known in the art and are not relied upon as constituting a part of the present invention.

Figure 1:
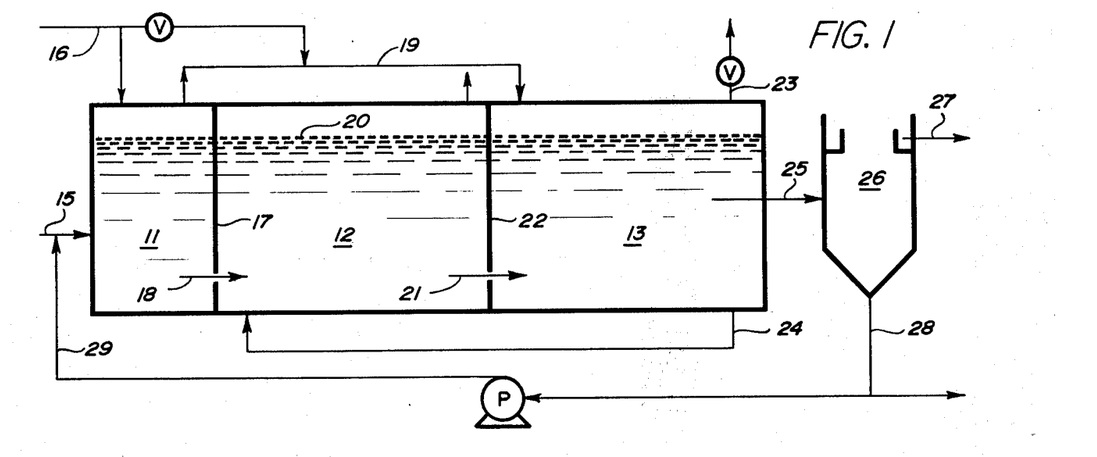
FIG. 1 is a schematic flow diagram of the simplest embodiment utilizing a single anoxic zone between two oxic zones.

Referring now to FIG. 1, a single treating basin is shown, partitioned into three separated treating zones or chambers 11, 12 and 13. Zones 11 and 13 are covered and enclosed, provision being made for restricted flow of liquor out of chamber 11 and from chamber 12 to 13. Chamber 12 is preferably closed to the atmosphere to prevent oxygen transfer from ambient air across the liquid surface. The waste to be treated is introduced into zone 11 by line 15. The wastewater thus introduced into zone 11 is preferably the effluent from a conventional primary sedimentation tank or clarifier (not shown) and contains carbonaceous organic matter (BOD) and nitrogenous material. The process of the invention could also be applied directly to whole raw wastewater that has not undergone primary clarification, with or without some degree of screening, degritting or degreasing, subject to the inherent encumbrance of handling a liquor containing inert solids and other matter that would otherwise be removed in primary pretreatment. Oxygen-rich gas, containing preferably 50% or more oxygen by volume, is introduced into zone 11 by line 16 and means are provided for obtaining thorough admixture of the liquor in zone 11 with the gas, as hereinafter more fully described. In the wall or partition 17 separating zones 11 and 12, an opening may be provided as indicated at 18, or other conduit means employed for restricted flow of liquid from zone 11 into zone 12. Above the liquid level in zone 11 a gas-collecting plenum is provided from which oxygen-rich gas is withdrawn by line 19 and transferred to closed zone 13.

In zone 12 the dissolved oxygen in the liquor from zone 11 is reduced by microbial consumption, whereby anoxic conditions are maintained therein. If desired and economically available, nitrogen or other inert gas may be introduced into the liquor in zone 12 to accelerate reduction of the dissolved oxygen level by stripping. Whether or not introduction of stripping gas is to be practiced therein, zone 12 is preferably closed to the atmosphere and means are provided for venting gas from that zone. Sufficiently low dissolved oxygen level required for maintaining anoxic conditions is maintained in that zone.

The treated liquid from zone 12 is discharged therefrom into adjacent oxic zone 13 by suitable conduit means or by provision of an opening 21 in the wall or partition 22 separating said zones. In zone 13 the liquid is thoroughly admixed with oxygen-rich gas introduced by line 19 which carries the effluent gas from zone 11, and to which line there may be added, if required, make-up oxygenating gas. The spent gas is collected in the plenum above the liquid level in zone 13 and discharged by vent line 23. A portion of the oxygenated mixed liquor from zone 13 is recycled to anoxic zone 12 by line 24, while the remainder is discharged by line 25 into a conventional sedimentation tank or secondary clarifier 26.

Figure 2:
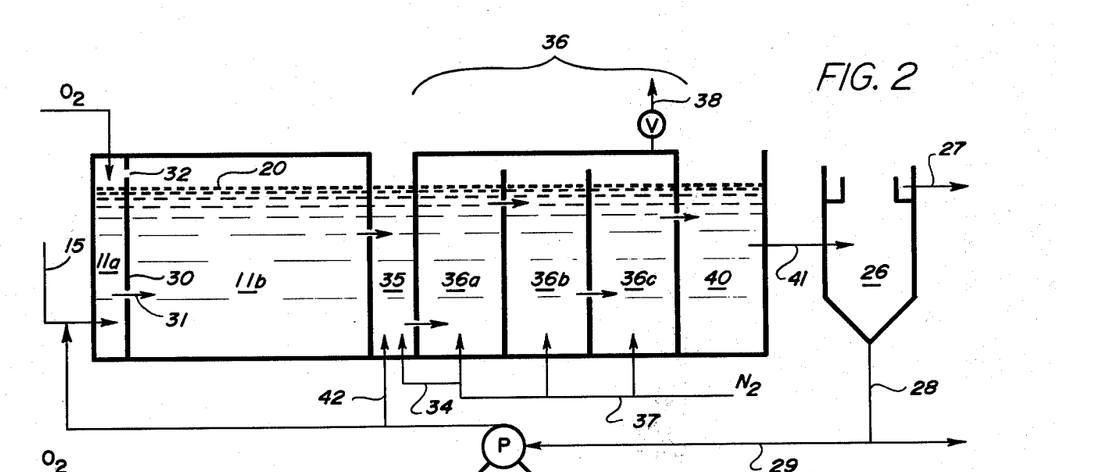
FIG. 2 is a schematic flow diagram of an alternative embodiment utilizing a single anoxic zone between two oxic zones.

In clarifier 26 the treated liquor is separated into a bottoms fraction of settled solids-containing sludge and a supernatant clarified liquid. The latter is discharged by line 27, while the bottoms portion is withdrawn by line 28, at least a portion thereof being recycled by line 29 to zone 11, thus furnishing an activated sludge containing the desired microorganisms utilized in zones 11, 12 and 13, to initiate and promote the biological processes therein. In FIG. 2, as in subsequent figures, similar parts are designated by the same reference numerals as in FIG. 1. In the particular embodiment illustrated in FIG. 2, zone 11 is divided by a wall 30 into separated compartments 11a and 11b. Compartment 11a is of relatively small capacity as compared to compartment 11b. Transfer of liquid from 11a to 11b may be effected by provision of an opening 31 in wall 30 below the liquid level or by other suitable conduit or controlled backmixing means. Above the liquid level a restricted opening 32 is provided in wall 30 for passage of gas from compartment 11a to compartment 11b. Instead of opening 32, the wall 30 may be imperforate above the liquid level and a gas line provided for gas flow communication between these compartments. Spent gas from compartment 11b is discharged together with the liquor therein to a chamber 35 open to the atmosphere. In chamber 35 dissolved gas including dissolved oxygen is stripped from the liquid to a low dissolved oxygen content which liquid then flows into the closed anoxic treating chamber 36. Preferably chamber 36 is partitioned into a plurality of separated sub-chambers or compartments. As shown in FIG. 2, three such sub-chambers or compartments are provided designated 36a, 36b, 36c, in restricted liquid flow communication in the recited sequence. Nitrogen or other inert gas is introduced upwardly through the liquid in each of the compartments of chamber 36 to insure solids mixing and maintain anoxic conditions, the mixing gas being vented through line 38. Purge gas from manifold 37 is introduced into chamber 35 by branch line 34 to assist in stripping oxygen from the liquor into the open atmosphere above, as well as to provide solids-liquid mixing and to accelerate achievement of anoxic conditions prior to discharge of the liquor into chamber 36. It is important that the changeover from oxic conditions to which the wastewater was last subjected in chamber 11 to the anoxic conditions to which it is next exposed be rapidly accomplished so as to avoid the development and existence of an intermediate condition of dissolved oxygen for sufficient time in chamber 35 that might promote proliferation of filamentous or other organisms having a high ratio of surface area to volume.

From the last compartment of chamber 36 the liquid is passed by suitable means, such as that earlier described for liquid transfer, into an open oxic treating zone 40, wherein it is subjected to aeration with air or other oxygen-rich gas introduced in a manner well known to this art. The treated liquor is discharged from chamber 40 by line 41 into clarifier 26. In the embodiment illustrated in FIG. 2, however, the recycled activated sludge in line 29 is divided so that only part of the recycled sludge is returned to the initial aerobic treating zone 11, the remainder being recycled to chamber 35 through branch line 42.

In embodiments such as that exemplified in FIG. 2, the reaction in compartments 11a and 11b constitute the first oxic treating stage, that in chambers 35 and 36 the intermediate anoxic stage, and the aeration in chamber 40 the final oxic stage. In each of the embodiments illustrated in FIGS. 1 and 2, denitrification is effected by bringing together in an anoxic zone conditions favoring conversion of nitrates and nitrites to innocuous nitrogen gas. Such favorable conditions include the simultaneous presence of (a) an adequate source of assimilable carbon to furnish cellular synthesis and energy requirements, (b) available nitrites and/or nitrates, and (c) denitrifying biomass. In embodiments in which only a relatively short oxic stage precedes the initial anoxic zone, $NO_x^-$ requirements are supplemented by recycle of mixed liquor from an oxic zone containing the same (as in the embodiment illustrated in FIG. 1), such liquor containing $NO_x^-$ as well as active biomass. On the other hand, with a sufficiently extensive oxic stage, as in FIG. 2, and consequent adequate supply of $NO_x^-$ by concurrent flow of mixed liquor from a preceding oxic stage, such internal recycle of mixed liquor to the anoxic zone from a downstream oxic stage is not necessary, but it is important to supply BOD and active biomass to the anoxic zone, which is accomplished by the return thereto of settled activated sludge from the clarifier.

While in the illustrated embodiment chamber 40 is shown as open to the atmosphere, a covered chamber may be employed, if desired, with means for introducing oxygen-containing gas.

Figure 3:
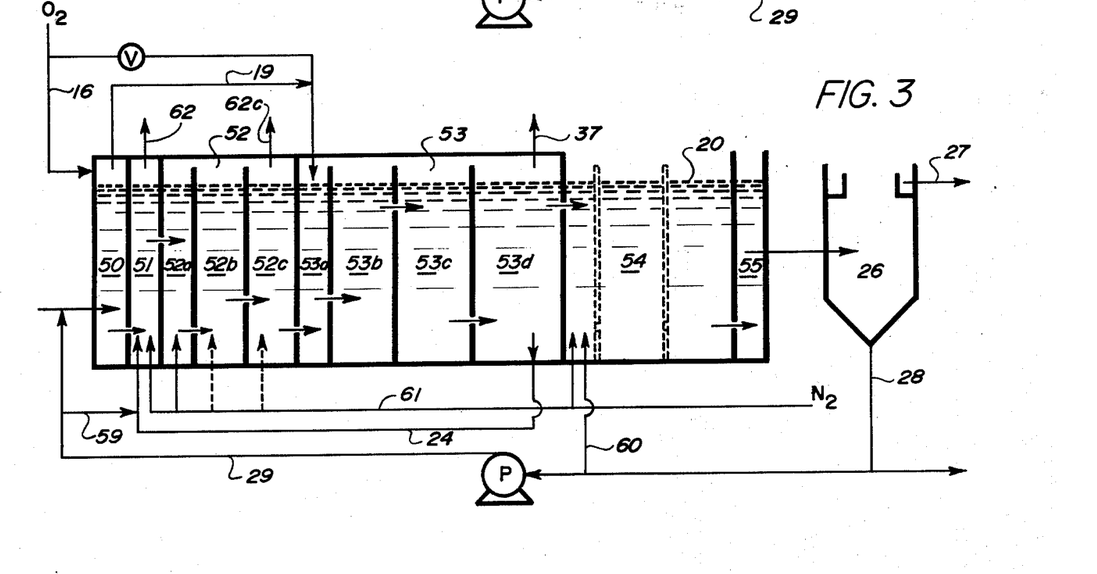
FIG. 3 is a schematic flow diagram of a further modified embodiment employing features of both FIGS. 1 and 2.

The embodiment illustrated in FIG. 3 likewise employs an initial oxic treating zone, constituted by chamber 50, a next succeeding anoxic treating zone constituted by closed and vented chamber 51 and closed and vented chamber 52; and a next succeeding oxic treating zone constituted by closed chamber 53, all of these chambers are in successive liquid flow communication in the recited sequence. Chamber 52 may be partitioned or otherwise subdivided into a plurality of compartments or sub-chambers in staged liquid flow communication. In the illustrated embodiment three such compartments or sub-chambers are shown as 52a, 52b, 52c. Likewise chamber 53 may be subdivided into a plurality of compartments or subchambers. In the illustrated embodiment, four such compartments are shown, designated 53a, 53b, 53c, 53d. Oxygen-rich gas is introduced into chamber 50 by line 16 and the gas collecting in the plenum above the liquid level in chamber 50 is passed into chamber 53 by line 19. As in the embodiment of FIG. 1, mixed liquor from the oxic treating zone, chamber 53, preferably from the terminal compartment thereof, is recycled to the preceding anoxic treating zone, chambers 51 and 52. As illustrated in FIG. 3, liquor from the terminal compartment 53d is recycled to chamber 51 by line 24. The remaining liquor from compartment 53d passes into an open anoxic chamber 54 wherein the liquor is essentially stripped of dissolved oxygen and then flows into a succeeding open chamber 55, wherein the liquor is further treated with air or other oxygen-containing gas to oxidize any small amounts of residual ammonia that might be present and to provide D.O. in the effluent. By the introduction of oxygen in the last treating chamber 55, the D.O. of the liquor is brought to desired high level before discharging into clarifier 26.

After the final oxic treatment in chamber 55 the liquor flows into a secondary clarifier 26 for settlement of the sludge layer solids. The settled activated sludge is recycled in part to chamber 50 by line 29, other portions thereof being recycled to anoxic zones constituted by chambers 51 and 54 through branch lines 59 and 60 respectively.

Nitrogen or other inert gas is introduced into chambers 51 and 52 by line 61 and spent gas vented therefrom by lines 62 and 62c. When the chamber 52 is partitioned into a plurality of compartments, each of such compartments may be provided with separate means for introduction of inert gas from a common manifold, and separate means for individually discharging gas from each such compartment; or the successive compartments may be provided with restricted openings in the partitions or with other gas flow conduit means therebetween, whereby the inert gas may be introduced into an initial or terminal compartment of the series and vented from the compartment at the opposite end of such series. As in the case of chambers 52 and 53, chamber 54 may also be partitioned to subdivide it into a plurality of successive compartments in liquid flow communication.

In any of the embodiments described, whether mixed liquor from a downstream oxic zone is returned to a preceding anoxic zone (as in FIG. 1), or a portion of recycled sludge from a secondary clarifier is returned to an anoxic zone (as in FIG. 2), or both recycled sludge and mixed liquor are employed (as illustrated in the embodiment of FIG. 3), it is important that the dissolved oxygen level in the initial oxic zone or sub-zone in which recycled sludge is first mixed with wastewater influent be at least 2 ppm. In subsequent oxic zones a lower D.O. level may be had so far as oxic conditions are satisfactorily maintained. To assure such conditions the D.O. level in oxic stages or sub-stages beyond the hydraulic section of initial contact must not be permitted to fall below about 1 ppm and preferably should be maintained at least somewhat above 1 ppm in any oxic zone in which substantial nitrification is required.

In practicing the mixed liquor recycle embodiment of FIG. 1, particularly in the case of a relatively weak wastewater, the BOD content of the mixed liquor under treatment in an anoxic stage may be insufficient to furnish the needed amount of assimilable carbon to support the biologic reactions for the desired degree of reduction of $NO_x^-$ therein. One way of supplementing the available carbon in the anoxic stage is by recycling a portion of BOD-containing recycle activated sludge to that stage. Alternatively, the assimilable carbon content may be supplemented by addition of primary sludge. As a further alternative, the reductants may be supplied by addition to the anoxic stage of an organic compound, such as methanol, readily biodegraded acetate, or alternative assimilable soluble carbon substrates.

Figure 4:
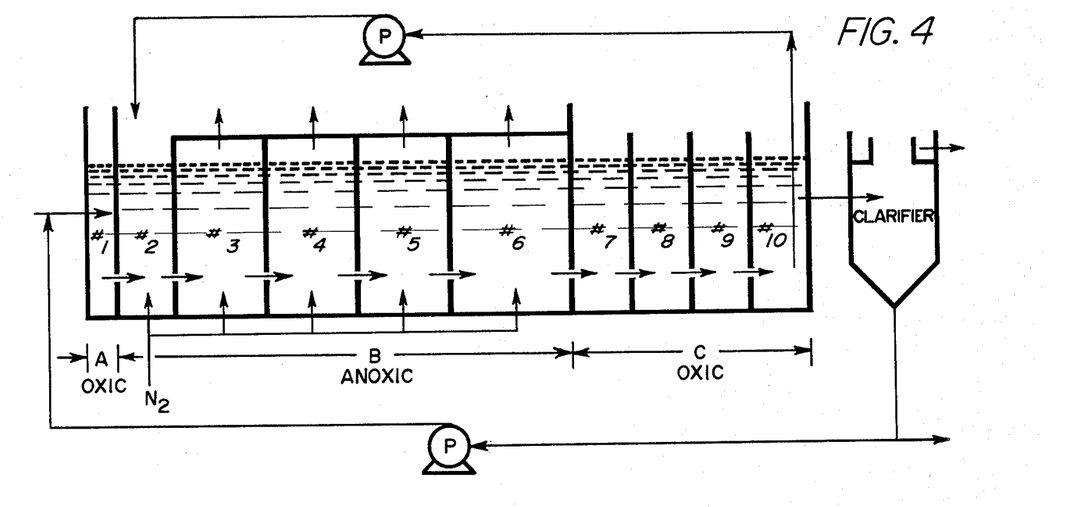
FIG. 4 is a schematic flow diagram of the laboratory unit employed in certain of the experimental runs.

A series of experimental runs were carried out in a laboratory unit of the configuration illustrated in FIG. 4, having a total of 46.5 liters, comprising an initial oxic zone (A) of 1.5 liters, followed by an anoxic treating zone (B) having in sequence five compartments (numbered 2 to 6) respectively of 3, 6, 6, 6 and 9 liter capacity, and a succeeding second oxic zone (C) having four compartments (numbered 7 to 10) in sequence of 3, 3, 4.5 and 4.5 liter capacity. The clarifier capacity was 17.5 liters. The fresh charge to the unit was the wastewater effluent from the primary clarifier of a municipal sewage plant at Easton, Pa. In this series of runs labeled A to F in the data of Table 1 below, part of the mixed liquor from the last oxic compartment 10 of the series was recycled to the first compartment 2 of the anoxic stage of the series. No attempt was made in these experimental runs to obtain optimum nitrogen removal from the wastewater.

In Runs A & B no external carbon source was added in the treatment of the waste. In Runs E & F carbonaceous material (sodium acetate) was added directly to the anoxic stage (chamber 2), while in Runs C & D the carbonaceous material was added to the initial contact stage (chamber No. 1).

It will be seen from Table 1 that in all of the runs about 99% or somewhat higher removal of ammonium nitrogen was achieved, indicating that effective nitrification had taken place. Also, total BOD removal in all the runs was 95% or higher (filtered basis) and sludge of good settling properties resulted. Comparing the total nitrogen removal in Runs A & B with that in the other runs, it appears that at the rather low BOD concentration of the influent wastewater, insufficient carbon is available after the initial oxidative treatment (A) to fully supply the carbon requirements for denitrification in the next anoxic stage (B).

From an examination of the data in Table 1, the following observations are to be noted. Comparing Runs A and B it will be seen that with the doubled internal recycle ratio the ammonia nitrogen in the effluent from the anoxic treatment (compartment 6) was significantly less in Run B, even though the ammonia nitrogen content of the influent was over 17% higher. This demonstrates the potentially superior nitrogen removal at the higher internal recycle ratio for this skeletal system of three stages. comparing the results obtained in Runs C and D with that of A and B, the influence of higher soluble BOD in the influent is manifested as well as the benefit of the higher internal recycle ratio (D vs. C). In runs E and F the content of soluble BOD in the influent was not increased but soluble BOD as sodium acetate was added to the anoxic stage, obtaining improved total denitrification. Here again the effect of the higher internal recycle ratio is shown by the significantly lower content of ammonia nitrogen (3.8 vs. 6.3 mg/l) in the mixed liquor effluent from the anoxic treatment (compartment 6).

The soluble BOD content of the wastewater influent treated in the runs of Table 1 is low and the ammonia nitrogen content rather high for an influent of this low BOD content. Ordinarily with wastewater of such characteristics it may be preferred to resort to addition of supplemental carbon from an external source directly to the anoxic treating zone, if desired, to effect optimum nitrogen removal. On the other hand, as shown in Run D, external carbon addition may not be needed to achieve a high level of removal of total nitrogen, if an adequate supply of soluble BOD is present in the wastewater influent.

Table 2 below. These runs were made primarily to collect information as to feasibility of the overall process employing sludge recycled from the secondary clarifier to supply biomass in the anoxic treating stage and to determine the effect of certain process variables. As shown in the table, excellent removal of ammonia nitrogen was obtained in all of the runs, indicating that almost complete nitrification was had in the oxic treating stage A. Also good removal of BOD was obtained, in the order of 90% or better in all of the runs except

TABLE 1

| Run | | A | B | C | D | E* | F** |
|---|---|---|---|---|---|---|---|
| Days of Operation | | 11 | 8 | 7 | 8 | 10 | 8 |
| Influent Detention Time | (hr) | 8.46 | 8.56 | 8.64 | 8.66 | 8.62 | 8.40 |
| Clarifier Sludge Recycle/Influent | | .32 | .31 | .31 | .30 | .32 | .29 |
| Internal Mixed Liquor Recycle/Influent | | 2.03 | 3.96 | 2.01 | 4.06 | 2.03 | 3.92 |
| Influent TSS | (mg/l) | 123 | 112 | 140 | 136 | 120 | 135 |
| Influent VSS | (mg/l) | 76 | 76 | 92 | 97 | 87 | 95 |
| Influent BOD Total | (mg/l) | 50 | 42 | 90 | 102 | 61 | 67 |
| Influent BOD Soluble | (mg/l) | 21 | 15 | 61 | 64 | 24 | 31 |
| MLVSS | (mg/l) | 4,247 | 4,268 | 4,462 | 4,530 | 4,222 | 4,321 |
| SVI | (ml/gTSS) | 70 | 63 | 66 | 64 | 59 | 57 |
| ZSV | (ft/hr) | 4.3 | 6.5 | 4.4 | 5.1 | 4.7 | 5.3 |
| $NH_3$—N Influent | (mg/l) | 28.4 | 33.4 | 29.2 | 27.6 | 29.9 | 28.3 |
| $NO_x$—N Influent | (mg/l) | .1 | .1 | .1 | .1 | .1 | .1 |
| $NH_3$—N Sludge Recycle | (mg/l) | .8 | 2.4 | 2.4 | 1.8 | .8 | 2.3 |
| $NO_x$—N Sludge Recycle | (mg/l) | 2.4 | 6.1 | .2 | 1.0 | .4 | .3 |
| $NH_3$—N Inf. Stage A | (mg/l) | 21.7 | 26.0 | 22.9 | 21.8 | 22.9 | 22.5 |
| $NO_x$—N Inf. Stage A | (mg/l) | .6 | 1.5 | .1 | .3 | .1 | .1 |
| $NH_3$—N Stage A | (mg/l) | 15.8 | 20.3 | 20.1 | 15.3 | 17.4 | 15.7 |
| $NO_x$—N Stage A | (mg/l) | 4.7 | 7.2 | 2.5 | 2.5 | 2.5 | 2.4 |
| $NH_3$—N Inf. Stage B | (mg/l) | 6.7 | 6.5 | 9.0 | 4.4 | 7.2 | 4.7 |
| $NO_x$—N Inf. Stage B | (mg/l) | 9.0 | 15.0 | 4.9 | 3.5 | 5.6 | 4.0 |
| $NH_3$—N Eff. Stage B | (mg/l) | 5.3 | 4.8 | 8.2 | 3.2 | 6.3 | 3.8 |
| $NO_x$—N Eff. Stage B | (mg/l) | 5.6 | 13.6 | .9 | 1.1 | .5 | 1.0 |
| $NH_3$—N Eff. Stage C | (mg/l) | .8 | 2.0 | 1.9 | .8 | .6 | 1.1 |
| $NO_x$—N Eff. Stage C | (mg/l) | 11.8 | 17.6 | 6.5 | 3.8 | 7.6 | 4.6 |
| $NH_3$—N Effluent | (mg/l) | .1 | .1 | .1 | .3 | .2 | .2 |
| $NO_x$—N Effluent | (mg/l) | 10.1 | 16.4 | 6.3 | 4.9 | 7.3 | 4.4 |
| Effluent BOD Total | (mg/l) | 6.8 | 7.7 | 10.3 | 10.1 | 9.1 | 10.9 |
| Effluent BOD Soluble | (mg/l) | 2.7 | 1.6 | 1.9 | 1.6 | 3.0 | 1.7 |
| % BOD removed T-T | (%) | 86.5 | 81.6 | 88.5 | 90.0 | 85.2 | 83.6 |
| % BOD removed T-S | (%) | 94.6 | 96.2 | 97.9 | 98.4 | 95.2 | 97.4 |
| % $NH_3$—N removed | (%) | 99.7 | 99.6 | 99.6 | 98.9 | 99.3 | 99.3 |
| % $\Sigma$ N removed | (%) | 64.2 | 50.5 | 78.2 | 81.3 | 75.0 | 83.8 |
| Temp Zone A | (° C) | 22.2 | 22.4 | 22.5 | 22.2 | 20.2 | 21.7 |
| F/M Oxic gBOD$_{st}$/gVSS/day | | .10 | .08 | .16 | .18 | .11 | .12 |
| α | | .25 | .27 | .33 | .35 | .28 | .24 |
| Fs/Ma Zone A | | 2.62 | 1.75 | 5.35 | 5.07 | 2.67 | 3.87 |

*Soluble BOD Source Added to Stage B at 12.6 mg/l BOD Based on Total Flow.
**Soluble BOD Source Added to Stage B at 7.5 mg/l BOD Based on Total Flow.

Figure 5:
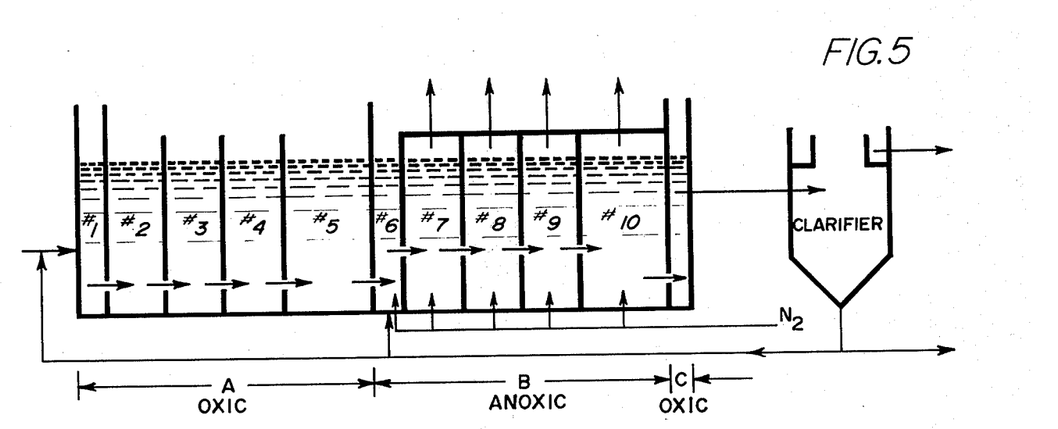
FIG. 5 is a schematic flow diagram of the laboratory unit employed in another series of experimental runs.

A series of runs were carried out conforming to the alternative embodiment illustrated in FIG. 2, wherein the supply of added biomass to the denitrification zone was obtained by introducing a part of the recycled sludge from the clarifier to the anoxic treating zone. The configuration of the laboratory unit employed is illustrated in FIG. 5.

The laboratory unit employed comprised a first oxic treating stage A a second anoxic stage B and a final oxic stage C. Each of stages A and B were subdivided into compartments, stage A having five compartments (numbered 1 to 5) and stage B five compartments (numbered 6 to 10). The relative capacities of the several stages and compartments are reported in Table 3 below. The charge to the unit was primary clarifier effluent from the municipal sewage plant at Easton, Pa.

Representative data from a number of runs made under the reported operating conditions are set out in Run L. In that run, it will be noted, a fairly large amount of primary waste sludge was added to the anoxic stage, and with the very small oxic cleanup stage following, there was insufficient provision for more complete removal of BOD. These runs further demonstrated that to obtain a high degree of denitrification, an adequate supply of a reductant source must be present in the anoxic treating stage or stages. Such reductant may be available from an internal source such as endogenous oxygen respiration demand or that from the BOD content of the wastewater influent or added BOD from sludge from the primary and/or secondary clarifier. Where the soluble BOD/$NH_3$—N ratio of the wastewater influent is relatively low as in the order of about 2 and below, it may be necessary to supply carbon directly to the anoxic zone from an external source in the form of a soluble organic compound, such as methanol, sodium acetate or the like.

TABLE 2

| Run | | G | H | I | J* | K | L** | M*** |
|---|---|---|---|---|---|---|---|---|
| Days of Operation | | 9 | 8 | 6 | 15 | 12 | 7 | 10 |
| Influent Detention Time | (hr) | 7.70 | 7.98 | 8.58 | 6.64 | 6.68 | 6.64 | 7.97 |
| Clarifier Sludge Recycle No. 1/Influent | | .31 | .31 | .30 | .30 | .31 | .29 | .40 |

TABLE 2-continued

| Run | | G | H | I | J* | K | L** | M*** |
|---|---|---|---|---|---|---|---|---|
| Clarifier Sludge | | | | | | | | |
| Recycle No. 2/Influent | | .31 | .30 | .59 | .61 | .62 | .60 | .00 |
| Influent TSS | (mg/l) | 59 | 60 | 84 | 117 | 143 | 131 | 106 |
| Influent VSS | (mg/l) | 44 | 49 | 61 | 88 | 95 | 87 | 75 |
| Influent BOD Total | (mg/l) | 35 | 61 | 44 | 70 | 62 | 46 | 51 |
| Influent BOD Soluble | (mg/l) | 16 | 31 | 24 | 35 | 27 | 19 | 19 |
| MLVSS Stage A | (mg/l) | 3250 | 3529 | 3161 | 3498 | 4030 | 3967 | 7408 |
| SVI | (ml/gTSS) | 60 | 58 | 56 | 42 | 40 | 37 | 32 |
| ZSV | (ft/hr) | 5.8 | 7.2 | 8.3 | 11.0 | 10.4 | 10.2 | 5.5 |
| MLVSS Stages B&C | (mg/l) | 4983 | 5293 | 5706 | 7171 | 7764 | 7854 | 7366 |
| $NH_3$—N Influent | (mg/l) | 36.5 | 38.8 | 37.5 | 26.0 | 28.9 | 31.8 | 35.9 |
| $NO_x$—N Influent | (mg/l) | .1 | .1 | .1 | .1 | .1 | .1 | .1 |
| $NH_3$—N Sludge Recycle | (mg/l) | 1.0 | .9 | 3.4 | .9 | 1.9 | 2.0 | 1.6 |
| $NO_x$—N Sludge Recycle | (mg/l) | 10.4 | 2.0 | 2.1 | .5 | 5.0 | .2 | 5.6 |
| $NH_3$—N Influent Stage A | (mg/l) | 28.2 | 29.8 | 29.6 | 20.3 | 22.6 | 25.0 | 26.0 |
| $NO_x$—N Influent Stage A | (mg/l) | 2.5 | .5 | 2.1 | .2 | 1.2 | .1 | 1.7 |
| $NH_3$—N Stage A | (mg/l) | 24.1 | 25.9 | 27.2 | 15.3 | 20.3 | 25.7 | 20.7 |
| $NO_x$—N Stage A | (mg/l) | 6.6 | 8.6 | 6.4 | 2.5 | 4.5 | 2.4 | 6.6 |
| $NH_3$—N Effluent Stage A | (mg/l) | 1.0 | .6 | 3.2 | .6 | 2.8 | 5.0 | .5 |
| $NO_x$—N Effluent Stage A | (mg/l) | 28.1 | 30.3 | 31.4 | 18.3 | 24.0 | 19.3 | 28.9 |
| $NH_3$—N Influent Stage B | (mg/l) | 1.0 | .7 | 3.5 | .6 | 2.5 | 4.1 | .5 |
| $NO_x$—N Influent Stage B | (mg/l) | 24.8 | 26.0 | 24.3 | 12.6 | 17.8 | 13.2 | 28.9 |
| $NH_3$—N Effluent Stage B | (mg/l) | 1.1 | 1.3 | 3.8 | .5 | 4.1 | 8.4 | 1.2 |
| $NO_x$—N Effluent Stage B | (mg/l) | 18.9 | 18.6 | 14.9 | 5.4 | 1.6 | 1.9 | 21.0 |
| $NH_3$—N Effluent | (mg/l) | .3 | .3 | .2 | .8 | .3 | 1.8 | .2 |
| $NO_x$—N Effluent | (mg/l) | 18.3 | 18.1 | 13.7 | .6 | 11.1 | 2.0 | 21.6 |
| Effluent BOD Total | (mg/l) | 13.7 | 16.7 | 11.1 | 13.3 | 10.4 | 22.0 | 12.9 |
| Effluent BOD Soluble | (mg/l) | 2.8 | 4.9 | 4.4 | 5.1 | 3.4 | 7.2 | 1.6 |
| % BOD removed T-T | (%) | 60.9 | 72.6 | 74.8 | 81.0 | 83.2 | 52.8 | 74.7 |
| % BOD removed T-S | (%) | 92.0 | 92.0 | 90.0 | 92.7 | 94.5 | 84.6 | 96.9 |
| % $NH_3$—N removed | (%) | 99.2 | 99.2 | 99.6 | 98.7 | 98.9 | 94.2 | 99.5 |
| % $\Sigma$ N removed | (%) | 49.2 | 65.5 | 63.1 | 96.9 | 60.0 | 88.0 | 39.5 |
| Temp. No. 1 Comp. | (° C) | 20.8 | 20.1 | 21.9 | 21.4 | 20.8 | 21.2 | 23.3 |
| F/M Oxic $gBOD_{Su}/gVSS$/day | | .11 | .19 | .15 | .15 | .11 | .09 | .04 |
| $\alpha$ | | .45 | .46 | .38 | .26 | .21 | .21 | .14 |
| Fs/Ma No. 1 Comp. | | 1.83 | 3.16 | 3.40 | 4.33 | 3.57 | 2.58 | 1.64 |

*Soluble BOD Source Added to Stage B at 32 mg/l BOD Based on Total Flow.
**Primary Waste Sludge Added to Stage B at 16 mg/l TSS, 16 mg/l $COD_u$; 2 mg/l $BOD_u$ Based on Total Flow.
***Primary Waste Sludge Added to Stage B at 12 mg/l TSS, 13 mg/l $COD_u$; 3 mg/l $BOD_u$ Based on Total Flow.

Table 3

| RUN | Zone A Total | \multicolumn{5}{c}{(liters)} | Zone B Total | \multicolumn{5}{c}{(liters)} | Zone C (liters) |
|---|---|---|---|---|---|---|---|---|---|---|---|---|---|
| | | 1 | 2 | 3 | 4 | 5 | | 6 | 7 | 8 | 9 | 10 | |
| G,H | 18 | 1.8 | 3.6 | 3.6 | 3.6 | 5.4 | 42 | 3 | 9 | 9 | 9 | 12 | 0.6 |
| I | 16 | 1.6 | 3.2 | 3.2 | 3.2 | 4.8 | 45 | 3 | 9 | 9 | 9 | 15 | 0.6 |
| J,K,L,M | 24 | 2.4 | 4.8 | 4.8 | 4.8 | 7.2 | 24 | 2.4 | 4.8 | 4.8 | 4.8 | 7.2 | 0.6 |

Comparing Runs G and H it will be observed that with the higher strength influent (total BOD and soluble BOD) there was an improved removal of total nitrogen and the $NO_x^-$ nitrogen content of the recycled sludge was considerably reduced (2.0 vs. 10.4 mg/l). Run I, however, showed results comparable to that of Run H even though a weaker wastewater influent was used in the latter instance. Thus, it appears, that the adverse effect of low strength influent can be compensated by increasing the amount of recycled sludge relative to influent admitted to the anoxic stage. By increasing the BOD content, for example by addition of soluble acetate directly to the anoxic stage, the influent detention time in the anoxic stage can be reduced, as is evident from Run J, while obtaining excellent overall removal of total nitrogen. At the lower overall residence time in the anoxic stage, Run K, the desired high degree of denitrification can not be achieved unless a sufficient source of carbonaceous BOD is available in that stage. In Run L, wherein primary waste sludge containing ammonia was added to the anoxic stage, the total nitrogen removal is not as good as that obtained in Run K. On the other hand, without addition of recycled activated sludge to the anoxic zone, Run M, extremely poor removal of nitrogen results despite addition of primary waste sludge to that zone. Primary waste sludge as a source of carbon would be recommended for use only if the $BOD/NH_3$ ratio therein is equal to or higher than that of the wastewater.

In all of runs G to M, which were carried out sequentially in time, good settling properties were maintained and even improved as shown by the decreasing SVI values.

The design of a practical commercial plant utilizing the systems of FIGS. 1 or 4 or even that of FIG. 3 would preferably entail the provision of at least four consecutive treating stages in the order of oxic-anoxic-oxic-anoxic. An optional final oxic stage, which need be of only comparatively small capacity, may be employed to assure the presence of dissolved oxygen in the mixed liquor entering the clarifier.

Figure 6:
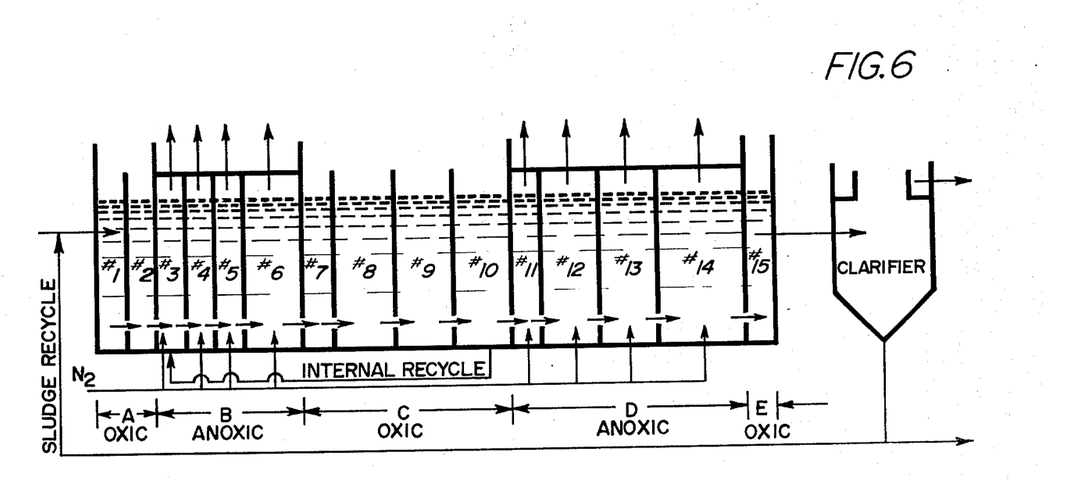
FIG. 6 is a schematic flow diagram of the laboratory unit employed in an expanded series of experimental runs.
Figure 7:
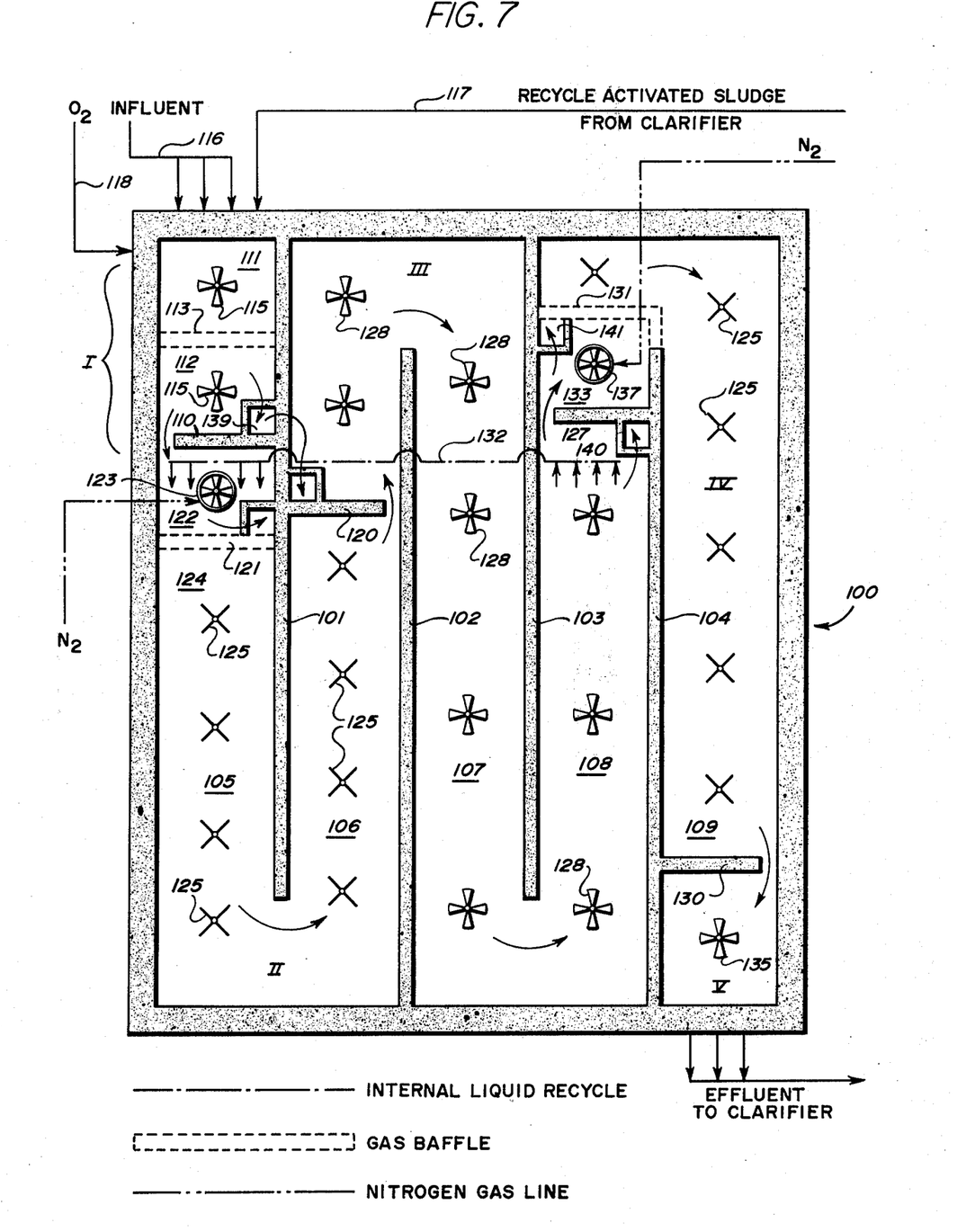
FIG. 7 is a diagrammatic floor plan view of a full scale plant in accordance with a preferred embodiment.

A laboratory demonstration of such a system using primary clarifier effluent from the Allentown, PA sewage treatment plant is described in Table 4 and depicted in FIG. 6. A strong mixed municipal/industrial wastewater, Allentown sewage contains a nominal 20 mg/l soluble $NH_3$—N and 40 mg/l total Kjeldahl nitrogen (TKN). Although the carbonaceous oxygen demand of the sewage is high, with total $BOD_5$ reaching 250 mg/l and filtered $BOD_5$ reaching 200 mg/l, simple $BOD_5$ removal results in soluble $NH_3$—N similar to that of the influent, demanding nitrification, hence denitrification for adequate treatment. Runs N and O reflect start-up conditions of the process following achievement of total nitrification, as reflected in >99% $NH_3$—N removal. Effluent $NO_x^-$ values were being reduced daily during these mg/l periods, and as MLVSS levels approached 3500 mg/l MLVSS and substrate influent strength increased, as reflected in the following runs P and Q, $NO_x^-$ reduction was essentially complete and total N removal, based on filtered influent and filtered effluent values, was >97%. Were reference made to influent TKN, the removal efficiencies would be higher yet, given proper effluent suspended solids control.

an anoxic stage II. Gas compartments 111 and 112 of stage I are separated by a gas baffle 113 permitting substantially unrestricted flow of liquid therebetween. Each of the gas compartments 111 and 112 is provided with a surface aerator 115 positioned at the surface of the liquid to effect intimate admixture of oxygen-containing gas from above the liquid level with the body of liquid therebelow. The liquid feed to the unit, comprising wastewater to be treated and recycled activated sludge, is initially charged to gas compartment 111 by suitable means 116 and 117 and the oxygen-containing

TABLE 4

| Run | | N | O | P | Q |
|---|---|---|---|---|---|
| Days of Operation | | 5 | 5 | 7 | 7 |
| Influent Detention Time | (hr) | 6.78 | 6.90 | 6.84 | 6.96 |
| Clarifier Sludge Recycle/Influent | | .26 | .25 | .26 | .25 |
| Internal Mixed Liquor Recycle/Influent | | 1.98 | 1.97 | 2.01 | 2.04 |
| Influent TSS | (mg/l) | 137 | 121 | 164 | 157 |
| Influent VSS | (mg/l) | 120 | 106 | 136 | 128 |
| Influent BOD Total | (mg/l) | 147 | 127 | 244 | 228 |
| Influent BOD Soluble | (mg/l) | 78 | 87 | 187 | 177 |
| MLVSS | (mg/l) | 3070 | 2677 | 3654 | 3206 |
| SVI | (ml/gTSS) | 98 | 92 | 98 | 83 |
| ZSV | (ft/hr) | 2.6 | 5.4 | 2.9 | 5.1 |
| $NH_3$—N Influent | (mg/l) | 20.6 | 21.2 | 18.2 | 19.9 |
| $NO_x$—N Influent | (mg/l) | .1 | .2 | .1 | .1 |
| $NH_3$—N Sludge Recycle | (mg/l) | .8 | .4 | 1.6 | 1.5 |
| $NO_x$—N Sludge Recycle | (mg/l) | .2 | .2 | .1 | .1 |
| $NH_3$—N Inf. Stage A | (mg/l) | 16.5 | 17.0 | 14.8 | 16.2 |
| $NO_x$—N Inf. Stage A | (mg/l) | .1 | .2 | .1 | .1 |
| $NH_3$—N Eff. Stage A | (mg/l) | 12.8 | 10.0 | 8.3 | 10.5 |
| $NO_x$—N Eff. Stage A | (mg/l) | 2.3 | 2.1 | 1.7 | 1.4 |
| $NH_3$—N Inf. Stage B | (mg/l) | 5.4 | 4.0 | 3.5 | 4.3 |
| $NO_x$—N Inf. Stage B | (mg/l) | 5.4 | 6.2 | 2.6 | 2.5 |
| $NH_3$N Eff. Stage B | (mg/l) | 4.3 | 3.8 | 4.8 | 4.3 |
| $NO_x$—N Eff. Stage B | (mg/l) | 3.8 | 5.0 | .2 | .5 |
| $NH_3$—N Eff. Stage C | (mg/l) | .7 | .3 | .6 | .5 |
| $NO_x$—N Eff. Stage C | (mg/l) | 7.4 | 8.8 | 3.1 | 3.2 |
| $NH_3$—N Eff. Stage D | (mg/l) | .3 | .5 | .7 | .7 |
| $NO_x$—N Eff. Stage D | (mg/l) | 4.2 | 5.6 | .1 | .3 |
| $NH_3$—N Effluent | (mg/l) | .1 | .1 | .3 | .2 |
| $NO_x$—N Effluent | (mg/l) | 4.1 | 5.8 | .1 | .4 |
| Effluent BOD Total | (mg/l) | 17.5 | 14.3 | 11.2 | 10.0 |
| Effluent BOD Soluble | (mg/l) | 5.7 | 8.5 | 3.6 | 3.8 |
| % BOD Removed T-T | (%) | 88.1 | 88.7 | 95.4 | 95.6 |
| % BOD Removed T-S | (%) | 96.1 | 96.2 | 98.5 | 98.4 |
| % $NH_3$—N Removed | (%) | 99.4 | 99.5 | 98.4 | 99.0 |
| % Σ N Removed | (%) | 79.4 | 72.4 | 97.7 | 97.0 |
| Temp No. 1 Comp. | (° C) | 21.2 | 20.4 | 21.9 | 21.5 |
| F/M Oxic $gBOD_{St}$/gVSS/day | | .35 | .34 | .49 | .51 |
| α | | .50 | .64 | .77 | .88 |
| Fs/Ma No. 1 Comp. | | 8.59 | 8.41 | 11.11 | 10.29 |

Staging Configuration
Oxic Stage 1.6, 1.6 1; Anoxic Stage 2.4, 2.4, 2.4, 4.8 1;
Oxic Stage 2, 6, 6, 6 1; Anoxic Stage 1.8, 3.6, 3.6, 5.4 1;
Oxic Stage 1.2 1.

During the course of runs P and Q the soluble phosphate removal from influent to effluent was in excess of 40%, there being no bleedback of phosphate under extended anoxic conditions in the clarifier sludge blanket. The absence of reversible phosphate uptake in the BOD removal plus nitrification plus denitrification system will lead to less costly chemical methods of phosphate removal or, given proper operation for specific influent conditions, may preclude the necessity of post treatment for phosphate removal, depending upon federal, state and local effluent standards.

A preferred form of configuration for a five stage plant layout is illustrated in FIG. 7. As shown, the floor plan layout comprises a substantially rectangular tank 100, divided by longitudinal pass walls 101, 102, 103, 104 into five passes designated 105, 106, 107, 108, 109. Except for the terminal portion of pass 109, tank 100 is provided with an imperforate roof or cover. In pass 105 a transverse stage wall 110 is provided. Wall 110 divides pass 105 into an oxic stage I constituted by gas compartments 111 and 112 and the first portion of gas also introduced into that gas compartment by suitable means 118, each in a manner well known to the art.

Stage wall 110 is provided with one or more ducts or openings therein for restricted passage of liquid from stage I to stage II. Stage II encompasses the remainder of pass 105 beyond wall 110 to the end of that pass and part of the way in reverse flow through pass 106 to a stage wall 120 separating anoxic stage II from oxic stage III in that pass. Beyond wall 110 and within pass 105 a transverse gas baffle 121 is provided to form a compartment or sub-zone 122 separated from the remainder of pass 105, designated 124.

Compartment 122 is provided with means for introduction and admixing of nitrogen gas therein which may be in the form of a submerged turbine 123 equipped with a surrounding gas sparger. Compartment 122 serves as a transition means for effecting rapid changeover from the oxic conditions in stage I to the anoxic conditions in stage II. The nitrogen introduced into compartment 122 effects stripping of dissolved oxygen from the mixed liquor, the nitrogen and stripped gas being discharged from chamber 122 by a suitable vent therein. Thus, while gas baffle 121 permits free flow of liquid out of compartment 122 into the remainder of stage II, the baffle is imperforate above the liquid level and prevents gas flow therefrom into portion 124. Compartment 112 is also provided with a vent 139 for discharge of undissolved gases from above the liquid level.

Pass wall 101 at its terminal end portion in a direction away from the inlet to chamber 111, is cut away or provided with suitable non-restricting openings therein to permit free flow of liquid from pass 105 into pass 106. The whole of stage II, in the run between baffle 121 and stage wall 120, is provided with longitudinally spaced mixing impellers 125, here shown to be eight in number, which maintain solids in suspension.

Stage wall 120 separates anoxic stage II from the succeeding oxic stage III and is provided with suitable ducts or openings for restricted flow of liquid from II to III, and is imperforate above the liquid level. The undissolved nitrogen gas in stage II may be separately vented in a manner to preclude oxygen flow from the atmosphere or from gas stages of oxic stages I or III. Once anoxic conditions have been established within stage II by stripping of dissolved oxygen from the liquor in transition compartment 122, it will usually be unnecessary to add more nitrogen to that stage, since access of free oxygen is prevented and nitrogen is being formed in situ by biologic degradation of nitrites and nitrates during stage II.

Oxygen-containing gas is admitted to stage III adjacent to wall 120. If excess oxygen was initially introduced into compartment 111, the gas vented from compartment 112 will be richer in oxygen than 21% and may be utilized in stage III with or without additional oxygen-containing make-up gas, as dictated largely by the characteristics of the initial wastewater. Stage III extends for the remaining portion of pass 106 beyond wall 120, into the whole of pass 107 and a portion of pass 108 up to stage wall 127 in pass 108. Pass walls 102 and 103 at their opposite terminal end portions are cut away or have suitable non-restricting openings therein to permit free flow of liquid from pass 106 to pass 107 and from pass 107 to pass 108 respectively. Throughout the run of stage III, longitudinally spaced surface aerators 128 are provided to effect intimate contact of oxygen gas with the liquid. In the embodiment illustrated nine surface aerators are used in stage III. At the terminal end of Stage III, adjacent stage wall 127, means are provided for venting accumulated and undissolved gases from that stage, while the liquid is passed in restricted flow through passages in wall 127 into the next anoxic stage (IV).

Undissolved oxygen and other accumulated undissolved gases are discharged from stage III by a suitable vent 140 provided at the terminal end of that stage, i.e. adjacent wall 127. Not all of the mixed liquid is permitted to flow from stage III to stage IV. A portion thereof is withdrawn by line 132 and recycled into compartment 122 of stage II, thereby introducing nitrites and nitrates into that stage as well as various microorganisms existing in the mixed liquor being discharged from stage III.

Stage IV extends for the balance of pass 108 beyond wall 127 and into pass 109 to stage wall 130, the terminal portion of wall 104 being cut away or suitable openings provided therein to permit free flow of liquid from pass 108 into pass 109. Spaced from wall 127 in stage IV a gas baffle 131 is provided similar to gas baffle 121 in pass 105, forming a transition compartment 133 serving to effect a quick changeover from the oxic conditions of stage III to the anoxic conditions of stage IV. To effect this purpose nitrogen is admitted into compartment 133 by a sparger associated with submerged turbine 137. In this way dissolved oxygen is rapidly stripped from the liquid in compartment 133 and vented therefrom by means 141 adjacent gas baffle 131 so that little or no free oxygen enters the mixed liquor of anoxic stage IV beyond baffle 131. Stage IV throughout the run between baffle 131 and wall 130 is provided with longitudinally spaced mixing impellers which may be similar to impellers 125.

From stage IV the mixed liquor passes in restricted flow through a suitable opening in wall 130 into stage V. Stage V is open to the atmosphere and air above the liquid level is incorporated into the liquid by operation of surface aerator 135. From stage V the mixed liquor is discharged into a clarifier (not shown) from which a portion of the settled activated sludge is recycled to stage I by line 117.

In the example which follows it is assumed that a configuration and arrangement such as that illustrated in FIG. 7 is to be used for treating municipal wastewater in a plant designed for an average flow capacity of 10 million gallons per day. Preferably, such wastewater prior to its introduction into the system of FIG. 7, will have undergone some form of gross solids removal, which may be typically primary clarification. To handle the daily volume of wastewater each of the five parallel passes of tank 100 may conveniently have a length/-width ratio of 6:1. For example, the overall dimensions of each of the five passes of tank 100 would be 189 × 31.5 feet with a depth of 15 feet, which would provide adequate room for 3⁻ million gallons tankage, corresponding to an influent turnover of 3 times a day or an influent detention time of 8 hours.

Stage I may comprise 25% of the length of pass 105 and the remainder of that pass from wall 110 downstream taken up by stage II. Stage II will continue around wall 102 into pass 106, and may take up 66.7% of pass 106 up to wall 120. The remaining length of 33.3% of pass 106, beyond wall 120, will then be taken up by stage III. Stage III will extend around wall 102, to take up the total length of pass 107 and around wall 103 into pass 108 up to wall 127; thereby taking 75% of pass 108. The remaining 25% of pass 108 beyond wall 127 will be taken up by stage IV, which stage extends up to wall 130 in pass 109 rounding wall 104. Within pass 109 the anoxic stage IV may extend for 83.3% of the length of that pass the remaining 16.7% beyond wall 130 being taken up by the final small aerobic stage V. Thus, in the proportion described the total of the oxic/aerobic and anoxic treating stages will be in 1:1 ratio.

In the preferred operation flow of oxygen-containing gas from compartment 111 to compartment 112 would be staged through a restricted opening or conduit in baffle 113 otherwise imperforate above the liquid level. As already indicated, the gas discharged from compartment 112 may be sent to the inlet of stage III with or without added oxygen-containing make-up gas. Likewise, it would be preferred to stage the concurrent flow of oxygen-containing gas in stage III. This could be readily accomplished by providing an imperforate baffle above the liquid level and extending for a short distance down into the liquid, between successive surface aerators, and providing restricted openings for gas passage in these baffles above the liquid level. While stage V has been indicated as open to the atmosphere, it will be appreciated that the invention is no way limited to such embodiment. If desired, stage V may also be covered and means provided for introduction of air or other oxygen-containing gas into that stage.

For a typical municipal wastewater having an average BOD of about 160 ppm, 40% of which is soluble, activated sludge may be recycled from the secondary clarifier in an amount constituting 20 to 50% of the fresh wastewater influent, to provide a designed MLVSS in the order of about 3000–5000 mg./l. The internal mixed liquor recycle from stage III to stage II (via line 132) may be in the range of 1:1 to 5:1 ratio to the wastewater influent entering stage II and preferably in the range of 1:1 to 3:1.

In the illustated embodiment, stage I is shown to be subdivided. into two compartments of substantially equal size. It will be understood of course that the subdivision of this first oxic stage could comprise three or more compartments of equal or unequal size. In the two equal compartment modifications of zone I, as illustrated, at an 8 hour liquid residence time in the unit 100 based on influent flow the residence time of the liquid in stage I, which occupies 5% of the plant volume capacity, would be 0.4 hours and that in the first compartment 111 of that stage slightly more than 0.2 hours, considering the hydraulic limits of the area under the influence of impeller 115 in compartment 111 beyond baffle 113. If the MLVSS of the mixed liquor in stage I has an activity, $\alpha$, of say 0.6, the $F_s$ to $M_a$ value in that stage would be:

$$\frac{F_s}{M_a} = \frac{64 \times 1.5 \times 3 \times 20}{3000 \times 0.6} = 3.20$$

The $F_s/M_a$ in the initial contact zone comprising compartment 111 and part of compartment 112 would be almost twice the calculated 3.20 value, thus assuring the development of dense, non-filamentous biomass of desirable settling properties.

Under optimal conditions of plant operation in which cryogenically rectified air makes available low cost oxygen of high purity and oxygen-free nitrogen, efficient use may be made of both gases. To accelerate the transition between oxic and anoxic conditions nitrogen gas may be passed through the liquid to reduce the dissolved oxygen using standard devices such as diffusers or submerged turbines, and additionally by sweeping the liquid/gas interface with nitrogen to prevent interfacial transfer of oxygen into the liquid by reducing the oxygen content of the gas phase.

Such acceleration of anoxic conditions favors stable operations in two ways. Extended periods of low dissolved oxygen, such as below 1 mg/l D.O., are avoided, thereby preventing conditions selectively favorable to high surface area to volume microphilic aerobes such as *Sphaerotilus natans* and *Leptothrix ochracea*, the presence of which may result in bulking sludge. Also beneficial is the presence of truly anoxic conditions, which not only permits maximum denitrification rates, but moreover provides an environment which Sphaerotilus, Leptothrix, and other undesirable organisms find inimical (*Bergey's Manual of Determinative Bacteriology*, eighth edition, R. E. Buchanan and N. C. Gibbons, co-editors, The Williams and Wilkins Co., Baltimore, 1974, specifically pages 129 and 130).

From operation of numerous variants of the proposed process in which strict oxic and anoxic conditions are maintained, the stability of sludge settling characteristics has been confirmed. Excellent sludge properties, such as SVI values below 100 ml per gram TSS and ZSV's above 2–5 ft/hr for MLVSS values above 3000 mg/l are routinely obtained if the initial oxic zone organic loading is maintained at a high $F_s/M_a$ value. $F_s$ refers to 1.5 times the filtered $BOD_5$ value determined following *Standard Methods* on an influent sample filtered through glass fiber filter paper used to remove and assay suspended solids. $M_a$ refers to "active mass" determined by normalization of the maximum specific oxygen uptake rate (MSOUR) to a norm $$\left(\ln \text{MSOUR} = 33.92 - \frac{8640}{T(^\circ K)}\right)$$

to obtain the activity coefficient alpha ($\alpha$), then multiplication of $\alpha$ times initial oxic zone MLVSS as determined by *Standard Methods* to give $M_a$. The maximum specific oxygen uptake rate is determined by monitoring the dissolved oxygen uptake rate of mixed liquor in contact with excess influent substrate in the presence of non-limiting dissolved oxygen and dividing the oxygen uptake rate as obtained in $mgO_2$ consumed per liter per hour by the MLVSS expressed as grams per liter. Hence, the units of MSOUR are mg/gm/hr.

Originally, as in U.S. Pat. No. 3,864,246, the determination of $F_s/M_a$ in nitrification systems was performed by exclusion of the nitrification dissolved oxygen uptake rate. This is done either by eliminating nitrification through the use of allylthiourea (ATU) or 2-chloro-6-(trichloromethyl) pyridine (TCMP, Dow N-Serve), techniques well documented in the art, such as by the article "Chemical Methods for Nitrification Control" by James C. Young, *Proceedings of the 24th Industrial Waste Conference*, Purdue, Ind., 1969, Part 2, pages 1090–1101 or, by analyzing the appearance of $NO_2^-$—N and $NO_3^-$—N during the course of the test, calculating the rate of oxygen consumption attributable to $NO_x^-$ appearance, then correcting downwards the MSOUR for nitrification oxygen uptake.

Observations in both high $BOD/NH_3$ and low $BOD/NH_3$ systems have, however, allowed simpification of MSOUR determinations by not eliminating the nitrification oxygen demand. This simplification is justifiable on a macroscopic basis within the range of rational application of the process, i.e. from a soluble $BOD_5/NH_3$—N range of 1.9 to approximately 30. 1.9 is the lower end of the range selected in that 1.91 times 1.5, the approximate correction for ultimate BOD to $BOD_5$, equals 2.86, the minimum stoichiometric requirement of BOD for denitrification. Thirty is chosen as an upper limit so that $NH_3$—N may not become a limiting substrate for organism growth in overall BOD removal. Since both highly active biomass and favorable macroscopic sludge property development under high $F_s/M_a$ conditions are fundamental to the invention herein described, it is natural to include respiration from all flocculating organisms, and nitrifying bacteria are flocculating organisms which contribute to biomass properties. Primary documentation of the flocculating ability of *Nitrobacter winogradskyi, Nitrosomonas*

*europaea* and *Nitrosococcus nitrosus* is offered by *Bergey's Manual of Determinative Bacteriology*, Eighth Edition, R. E. Buchanan and N. E. Gibbons, co-editors, the Williams and Wilkins Co., Baltimore, 1974, pages 451–52, 453–54 and 455 respectively.

In U.S. Pat. No. 3,864,246 a minimum $F_s/M_a$ value of .4 is set out to promote the selective proliferation of dense active biomass and to preclude development of bulking sludge. In the system of the present invention it has been found that filamentous organisms are repressed under strict anoxic conditions, thereby permitting lower $F_s/M_a$ values in the initial oxic compartment. Thus, the $F_s/M_a$ values in the initial oxic zone may safely be at 2, and in instances in which the content of inert suspended solids in the influent is high (as above about 40 mg/l) the $F_s/M_a$ values may be as low as 1.5 without immediate detriment to the system. Also, because of the permitted lower $F_s/M_a$ ratio, the D.O. of the initial contact zone may be as low as 1 ppm (the minimum for successful nitrification) but is preferably maintained at least at 0.1 times the $F_s/M_a$ ratio or above 2 ppm whichever is higher.

We claim:

1. In the purification of wastewater by an activated sludge system wherein the wastewater is subjected, during continuous flow through successive treating zones, to sequential treatments to effect, in addition to reduction in quantity of BOD content, removal of nitrogenous pollutants, the method which comprises:
    a. initially mixing influent wastewater containing BOD and nitrogenous material with activated sludge capable of removing BOD, nitrifying and denitrifying, and with free oxygen-containing gas under oxic conditions to provide a mixed liquor;
    b. passing the mixed liquor from step (a), without intermediate separation of solids therefrom, to further treatment under anoxic conditions in the presence of nitrites and/or nitrates and in the presence of microorganisms effective in degrading nitrites and nitrates present during such treatment of the mixed liquor to innocuous nitrogen gas;
    c. subjecting mixed liquor discharged from step (b) to further treatment in a subsequent oxidation zone under oxic conditions with oxygen-containing gas;
    d. directly introducing the mixed liquor from the last treating zone into a settling zone to effect separation of settled solids from supernatant liquid;
    e. returning a portion of the settled solids as activated sludge to step (a);
    f. returning a portion of the microorganisms which have undergone oxidative treatment under oxic conditions to step (b);
    g. while maintaining in at least the first oxic stage of treatment of said mixed liquor a D.O. level of at least 1 ppm and an $F_s/M_a$ ratio of at least 1.5, wherein
        $F_s$ is equal to 1.5 times the weight of the soluble $BOD_5$ content of the influent wastewater charged per day to step (a), and
        $M_a$ is the weight of MLVSS in the mixed liquor of step (a) multiplied by an activity coefficient $\alpha$, wherein $\alpha$ represents the ratio of the oxygen uptake rate of the volatile suspended solids under oxidation to a reference maximum specific oxygen uptake rate MSOUR at the same temperature,
    MSOUR being determined by the equation:

$$\ln MSOUR = 33.92 - \frac{8640}{T(°K)}$$

said $F_s/M_a$ ratio being maintained by controlling at least one variable selected from the group consisting of initial stage influent residence time, activated sludge recycle rate, and initial stage MLVSS.

2. The method as defined in claim 1 wherein a portion of the mixed liquor from step (c), containing nitrites and nitrates together with microorganisms present therein, is returned to step (b).

3. The method as defined in claim 1 wherein a portion of the settled solids from step (d) is returned to step (b).

4. The method as defined in claim 1 wherein a supplemental source of available carbon is added to the first anoxic treating stage.

5. The method as defined in claim 4 wherein the supplemental source of carbon is settled primary sludge.

6. The method as defined in claim 4 wherein the supplemental source of carbon is an externally supplied assimilable organic carbon compound.

7. The method as defined in claim 1 wherein nitrogen gas is used to accelerate the onset of anoxic conditions by dissolution in at least the first anoxic stage.

8. The method as defined in claim 1 wherein additional successive alternating anoxic and oxic stages are added.

9. The method as defined in claim 1 wherein four treating stages are employed and the last treating stage (d) is an anoxic stage.

10. The method as defined in claim 1 wherein the $F_s/M_a$ ratio in said hydraulic section of initial contact is at least 2.0 and the D.O. level therein is at least 2 ppm.

11. The method of biologically purifying wastewater containing carbonaceous and nitrogenous biodegradable materials which comprises:
    a. continuously flowing the wastewater without intermediate solids separation through successive treating zones wherein the flowing wastewater is subjected to an initial oxic treating stage and to one or more sequences of biologic treating stages, each of said sequences consisting of an anoxic treating stage followed by an oxic treating stage;
    b. separating the treated wastewater from the last treating stage to provide a settled sludge fraction and a supernatant liquid effluent;
    c. mixing in the initial oxic treating stage a recycled portion of said settled sludge fraction capable of removing BOD, nitrifying and denitrifying, with incoming wastewater and with a gaseous stream containing $O_2$, to provide in said first treating stage a D.O. level of at least 1 ppm,
    d. said initial oxic treating stage having one or more individual hydraulically separate oxic treating sections;
    e. maintaining in the initial oxic section in which the incoming wastewater is first mixed with recycled sludge a ratio of at least 1.5 of soluble carbonaceous food to active biomass, as defined by the expression $F_s/M_a$;
    wherein $F_s$ is equal to 1.5 times the weight of the soluble $BOD_5$ content of the daily wastewater charged to the first oxic zone and $M_a$ is the active portion of the MLVSS in that zone and is equal to α times the weight of MLVSS and α is equal to the ratio of the oxygen uptake rate of the volatile suspended solids in that zone to a reference maximum specific oxygen uptake rate MSOUR at the treatment temperature, MSOUR being determined by the equation $$\ln MSOUR = 33.92 - \frac{8640}{T(°K)}$$

said $F_s/M_a$ ratio being maintained by controlling at least one variable selected from the group consisting of initial stage influent residence time, activated sludge recycle rate, and initial stage MLVSS; and f. adding to at least the first anoxic treating stage a portion of the mixed liquor returned from a subsequent oxic stage downstream thereof in the sequence.

12. The method as defined in claim 11 wherein the $F_s/M_a$ ratio in said initial oxic section is maintained above 2 and the D.O. level is maintained above 2 ppm.

13. The method as defined in claim 11 wherein the gaseous stream to stage one is at least 50% $O_2$ by volume.

14. The method as defined in claim 12 wherein the terminal treating stage is an anoxic stage.

15. The method as defined in claim 12 wherein the returned mixed liquor is added to the initial compartment of a multicompartment anoxic treating stage.

16. The method as defined in claim 12 wherein a supplemental source of BOD is added to the first anoxic stage.

17. The method as defined in claim 16 wherein the supplemental source of BOD is a recycled portion of said settled sludge fraction.

18. The method as defined in claim 16 wherein the supplemental source of BOD is settled primary sludge.

19. The method as defined in claim 16 wherein the supplemental source of BOD is an externally supplied assimilable organic carbon compound.

20. The method as defined in claim 11 wherein nitrogen gas is admitted to at least the first anoxic section to accelerate the onset of anoxic conditions.

21. The method of biologically purifying wastewater containing carbonaceous and nitrogenous biodegradable materials which comprises:

a. continuously flowing the wastewater without intermediate solids separation through successive treating zones wherein the flowing wastewater is subjected to an initial oxic treatment and to one or more sequences of biologic treating stages, each of said sequences consisting of an anoxic treating stage followed by an oxic treating stage;

b. separating the treated wastewater from the last treating stage to provide a settled sludge fraction and a supernatant liquid effluent;

c. mixing in the initial oxic treating stage a recycled portion of said settled sludge fraction capable of removing BOD, nitrifying and denitrifying, with incoming wastewater and with a gaseous stream containing $O_2$, to provide in said first treating stage a D.O. level of at least 1 ppm, d. said initial oxic treating steps having one or more individual hydraulically separate oxic treating sections;

e. maintaining in the initial oxic section in which the incoming wastewater is first mixed with recycled sludge a ratio of at least 1.5 of soluble carbonaceous food to active biomass as defined by the expression $F_s/M_a$;

wherein $F_s$ is equal to 1.5 times the weight of the soluble $BOD_5$ content of the daily wastewater charged to the first oxic zone and $M_a$ is the active portion of the MLVSS in that zone and is equal to α times the weight of MLVSS and α is equal to the ratio of the oxygen uptake rate of the volatile suspended solids in that zone to a reference maximum specific oxygen uptake rate MSOUR at the treatment temperature, MSOUR being determined by the equation $$\ln MSOUR = 33.92 - \frac{8640}{T(°K)}$$

said $F_s/M_a$ ratio being maintained by controlling at least one variable selected from the group consisting of initial stage influent residence time, activated sludge recycle rate, and initial stage MLVSS; and f. adding to at least the first of said anoxic stages a portion of the recycled sludge fraction from the aforesaid separating step.

22. The method as defined in claim 21 wherein the $F_s/M_a$ ratio in said initial oxic section is maintained above 2 and the D.O. level is maintained above 2 ppm.

23. The method as defined in claim 21 wherein the gaseous stream to stage one is at least 50% $O_2$ by volume.

24. The method as defined in claim 21 wherein the terminal treating stage is an anoxic stage.

25. The method as defined in claim 21 wherein mixed liquors returned from a downstream oxic stage is added to the initial section of at least one multisectional anoxic treating stage.

26. The method as defined in claim 21 wherein a supplemental source of BOD is added to the first anoxic stage.

27. The method as defined in claim 26 wherein the supplemental source of BOD is settled primary sludge.

28. The method as defined in claim 26 wherein the supplemental source of BOD is an externally supplied assimilable organic carbon compound.

29. The method as defined in claim 21 wherein nitrogen gas is admitted to at least the first anoxic section to accelerate the onset of anoxic conditions.

* * * * *